United States Patent [19]

Beebe

[11] 4,141,577
[45] Feb. 27, 1979

[54] SADDLE CLAMP AND METHOD OF MANUFACTURE

[76] Inventor: J. Ted Beebe, 22511 Sunnydale, St. Clair Shores, Mich. 48081

[21] Appl. No.: 833,164

[22] Filed: Sep. 14, 1977

[51] Int. Cl.² ............................................. F16L 13/14
[52] U.S. Cl. ................................ 285/382.2; 285/420; 24/277; 29/428
[58] Field of Search .................... 285/382, 382.1, 420, 285/243, 282.2; 24/277, 30.5

[56] References Cited

U.S. PATENT DOCUMENTS

| | | | |
|---|---|---|---|
| 2,959,834 | 11/1960 | Graham et al. | 24/277 |
| 3,137,053 | 6/1964 | Osborn et al. | 24/277 |
| 3,192,593 | 7/1965 | Osborn et al. | 24/277 |
| 3,900,933 | 8/1975 | Engman et al. | 24/277 |
| 3,984,134 | 10/1976 | Engman et al. | 24/277 X |

Primary Examiner—Werner H. Schroeder
Assistant Examiner—C. J. Arbes
Attorney, Agent, or Firm—Krass & Young

[57] ABSTRACT

A saddle pipe clamp is disclosed of the type including a U-bolt cooperating with a saddle member receiving the ends of the U-bolt which are adapted to apply a clamping pressure about the periphery of a pipe section by means of a pair of nuts threadably engaging the ends of the U-bolt, drawing the outer portion of the U-bolt towards a radiused inner contour of the saddle member. A folded sheet metal saddle member is constructed from a sheet metal blank folded into a three layer stack and spot welded together to form a unitary clamping saddle member. Formed end sections of the blank provide eyes for receiving the U-bolt ends. The middle layer is formed with a slightly smaller pipe engaging radius so as to act as a pressure ridge for sealingly deforming the pipe sections during clamping of the pipe joints. The outer contour of the saddle member is also radiused to minimize the envelope of the assembled pipe clamp without compromising the rigidity of the saddle member to the clamping forces.

6 Claims, 4 Drawing Figures

SADDLE CLAMP AND METHOD OF MANUFACTURE

BACKGROUND OF THE INVENTION

1. Field of the Invention

This invention concerns pipe clamps and more particularly clamps of the saddle type in which a U-bolt member is slidably received in eyes on opposite sides of the saddle member with the interior curvature of the U-bolt and a corresponding interior curvature on the saddle member providing an opening within which the pipes to be clamped are received. Tightening of the U-bolt is accomplished by means of nuts threadably engaging the U-bolt ends, with a clamping pressure thus applied about the pipe periphery.

2. Description of the Prior Art

Such saddle clamps are in near universal use in the clamping together of various sections of automotive exhaust systems, i.e., exhaust pipe, muffler, and tailpipe sections, etc., and are of the construction described above, i.e., with a U-bolt member cooperating with a saddle member to clamp the various joints of the system together. Due to the production volume involved in automotive markets, the cost of construction of the clamp is paramount and in minimizing the cost, it is highly desirable to utilize the simplest possible manufacturing steps and most efficient use of material. Since the U-bolt itself is of maximum simplicity and efficiency in terms of the material usage, the saddle member is the element in which careful design is likely to achieve cost savings. In achieving such maximum efficiency of material and simplicity of manufacturing techniques, the performance requirements of the clamping unit must of course not be compromised. This performance must include adequate rigidity of the saddle member to resist the distorting force generated by assembly of the clamping unit, care being taken that a design does not impose asymmetrical forces such that bending distortion of the saddle member takes place upon tightening of the U-bolt nut and that the structural configuration of the saddle member is such as to afford maximum rigidity along the direction to which the forces are applied. The clamping pressure in these applications generates a sealing deformation of the pipes which are to be clamped along the interior edge of the saddle clamp as well as of the U-bolt radius. The clamping action is accomplished upon the achievement of sufficient distortion or deflection of the joints to generate the desired tight fit between the joined pipe sections.

The rigidity of the saddle member of course must be adequate to resist the force levels which are necessary to be developed in order to carry out the deforming of the pipe sections. Such forces are largely dependent on the surface pressure which can be applied by the saddle clamp member if the surface area engaging the pipe sections is relatively large, the force levels required for adequately deforming the pipe sections is relatively high necessitating a relatively massive saddle member.

Another requirement which must be met is that of a minimum outside envelope of the assembled U-bolt saddle clamp configuration since clearance is often very limited in such applications between surrounding automotive body structures. The design of the saddle member should thus be such that while being of maximum rigidity in the direction of application of the forces, it does not increase the envelope of the assembled clamp.

Finally, the manufacturing method used to form the clamping member of course should be as simple as possible to achieve the aforementioned design requirements so as to minimize the cost of fabrication.

While pressure ridges have heretofore been recognized as desirable and indeed have been incorporated in similar pipe clamps, generally the pressure ridge has been created by one of three different expedients. In the Brown U.S. Pat. No. 3,040,407 the use of a wire form and/or a stamped ridge is disclosed to increase the unit pressure on the clamp pipe. This general approach is also disclosed in the Graham et al U.S. Pat. No. 2,959,834, Koehler U.S. Pat. No. 3,178,208, Power et al U.S. Pat. No. 3,222,090 and Engman et al U.S. Pat. No. 3,900,933. However, these saddle configurations are relatively massive to accommodate the presence of an integral pressure ridge. If a wire form pressure ridge is used with a light duty saddle construction the resulting clamping assembly is not able to resist the relatively high clamping pressure as is required for clamping exhaust system components together. The relatively massive saddle configurations involve relatively large amounts of material and are expensive to manufacture.

Riker U.S. Pat. No. 2,719,345 shows a chamfering of the ends of a layered sheet metal saddle to increase the unit clamping pressure. Such chamfering involves an extra manufacturing step and again would appear to create a possibility that a sharp edge could result which could cause splitting of the clamped pipe side walls.

This patent, as well as the Osborn et al U.S. Pat. No. 3,192,593, the Spotts et al U.S Pat. No. 3,605,214, the Dowling et al U.S. Pat. No. 3,879,815 and the Heckethorn U.S. Pat. No. 3,955,250 all show layered sheet metal type saddle construction, which while an efficient form of construction, does not show a satisfactory pressure increasing configuration such that assembly requires a high torque level to be exerted on the nuts necessitating relatively heavy U-bolt and saddle specifications to withstand the high forces required.

Accordingly, it is an object of the present invention to provide a pipe clamp of the type including a U-bolt and saddle member assembly in which the saddle member is configured to minimize the distorting forces applied on the saddle member, to minimize the amount of material which must be utilized.

It is another object of the present invention to provide such a saddle clamp assembly in which the pressure which is to be applied on the joint pipes by the saddle is maximized so as to reduce the clamping pressure or forces which must be developed by the clamping assembly in providing the final assembled pipe joint.

It is a further object of the present invention to provide such a clamping assembly saddle member which is formed by a simple, low cost method of manufacture while providing the aforementioned required rigidity to the forces generated during installation.

SUMMARY OF THE INVENTION

These and other objects, which will become apparent upon a reading of the following specification and claims, are accomplished by a saddle clamp assembly in which the saddle member is formed in a layered or stacked construction, preferably by means of a folded, one-piece sheet metal construction spot welded together to form a unitary structure. Saddle eyes adapted to slidably receive the ends of the U-bolt are formed along the intermediate portions of the sheet metal blank and in the final formed construction are aligned with the central layer, each of the layers configured with an inner radiused contour in conformance with the radius formed on the U-bolt but the central layer is formed with a slightly smaller radius so as to protrude along the radius contour from that of the outer layers. This protrusion provides a pressure surface to increase the unit surface pressure which may be applied by the saddle member in engagement with the pipe section to be clamped. The outer surface of the layered construction is also radiused to minimize the envelope U-bolt saddle members while affording maximum rigidity of the saddle member to the clamping forces.

DETAILED DESCRIPTION

Figure 1:
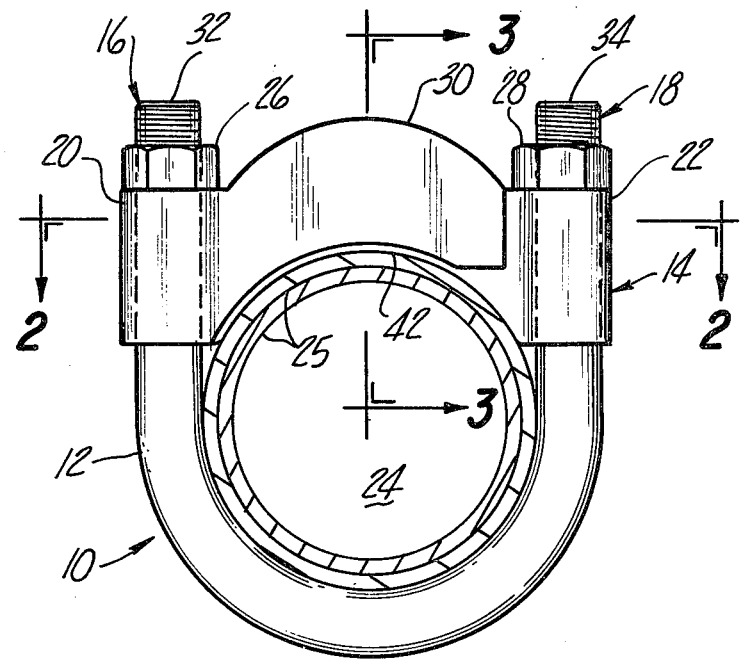
FIG. 1 is a front elevational view of an assembled clamping unit according to the present invention.

In the following detailed description, certain specific terminology will be utilized for the sake of clarity and a specific embodiment described in accordance with the requirements of 35 USC 112, but it is to be understood that the same is not intended to be limiting and indeed should not be so construed inasmuch as the invention is capable of taking many forms and variations within the scope of the appended claims.

Referring then to the drawings, the clamping assembly 10 includes a U-bolt member 12 and a saddle member 14. The U-bolt member 12 is formed into a configuration having an inner radius as shown with the end portions 16 and 18 extending parallel to each other and being received through eyes 20 and 22 formed on either end of the saddle member 14.

The eyes 20 and 22 extend along axes parallel to the major plane of the saddle member, such that the major dimension of the saddle member is available to resist the clamping forces applied to the eyes 20 and 22.

Saddle member 14 is formed with an inner contour along a radius in correspondence with the radius with which the interior surface of the U-bolt 12 is formed so as to produce a pipe receiving enclosure 24 of the diameter corresponding to the outside diameter of the pipe sections 25 clamped.

Nuts 26 and 28 are threadably engaged with the threaded end portions 16 and 18 of the U-bolt member 12 such that upon tightening of the nuts 26 and 28, a clamping pressure is generated on the pipe sections 25 disposed within the opening 24. The outer contour of the body portion of the saddle 12 comprises three stacked sheet metal layers, each having an external radius configuration 30 which lies within the envelope defined at its outer perimeter by the terminal portions 32 and 34 of the end sections 16 and 18 of the U-bolt 12. This configuration maximizes the ridigity of the saddle 14 while not increasing the overall envelope of the clamping assembly 10 by the perimeter of the U-bolt 12.

Figure 3:
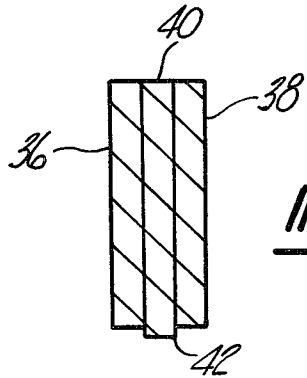
FIG. 3 is a view of the section taken along the line 3—3 of FIG. 1.

The saddle member 14 is formed from a single piece of sheet metal as will be described in further detail in the description of the method of fabrication of the saddle member 14, with a single piece of sheet metal folded into the three layer construction described. The two outer layers 36 and 38 have aligned radiused cutouts along one edge which are greater than the radius of a similar concentric cutout in the third or central layer 40 as indicated in FIGS. 1 and 3. This creates a protrusion of the contour at 42 which provides an inherent pressure ridge upon stacking of the layers 36, 38 and 40.

Figure 2:
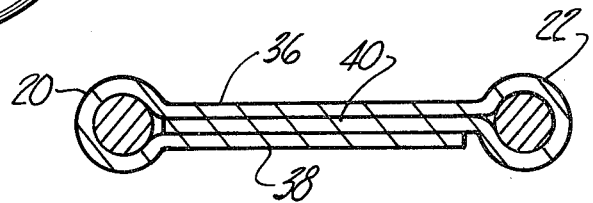
FIG. 2 is a view of the section taken along the line 2—2 of FIG. 1.

It will be further noted in connection with FIG. 2 that since the central layer 40 is aligned with the centerline of the eyes 20 and 22 at either end, that the point of application of the clamping forces which are created by the U-bolts is in alignment with the central layer 40 and thus the pressure ridge.

Accordingly, the application of the clamping pressure is greatly enhanced by the reduction in the area engaging the surface of the pipe to be clamped and distorting forces created by any offset between the point of application of the clamping forces and the pressure ridge are avoided.

Figure 4:
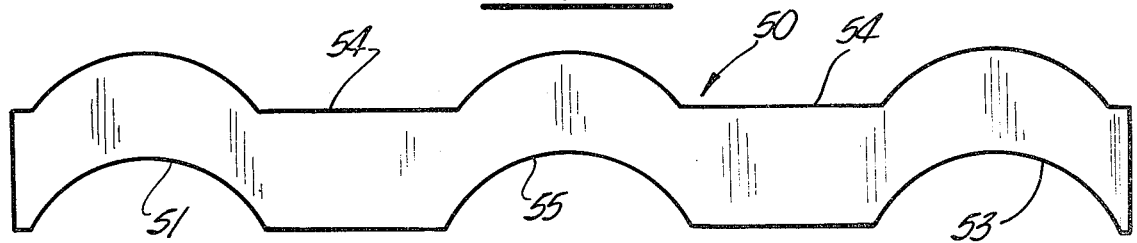
FIG. 4 is a plan view of the sheet metal blank utilized is manufacturing the saddle member used in the clamping assembly depicted in FIG. 1.

Referring to FIG. 4, the method of manufacturing the clamp shown in FIGS. 1 through 3 utilizes a flat sheet metal blank 50 punched from steel alloy sheets of an appropriate thickness for providing suitable strength for the fabricated saddle member 14. In a typical embodiment, 0.106 inch thick steel was utilized.

The sheet steel blank 50 is formed with successive arcuate cutouts 51, 55 and 53, with the radiused cutouts 51, 55 of the same radius and corresponding to the inner radius of the saddle member 14. Since the two radiuses of cutouts 51 and 55 are those corresponding to the outer layers 36 and 38, they accordingly should be of somewhat greater radius than the radius of cutout 53 which corresponds to the slightly smaller radius of the central layer 40. This difference in size is the order of 0.03 inch so as to create the protrusion of the edge defined by the radius as described.

Intermediate sections 54 between the cutouts 51, 53 and 55 are provided of sufficient length to accommodate the formation of the bends which will provide the eyes 20 and 22. The one end section is terminated as shown clear of the radius formed by the bend of the blank 50 while the opposite end is terminated so as to not protrude into the opening of the eye 20 as shown. The sheet metal blank 50 is formed into the saddle clamp member 14 by forming the radiused eyes 20 and 22 intermediate the cutouts 51 and 55, and 55 snd 53, such that the eyes 20 and 22 are formed to be integral with the layers. The central layer 40 is folded to be inserted between the outer layers 36 and 38, with the cutouts 51, 53 and 55 having their centers in alignment.

This forming is carried out by known metal forming techniques such as in a progressive die set. Finally, the resulting folded layers are joined into a unitary structure by suitable welding techniques such as by the application of a number of spot welds securing the three layers together.

It is understood that normal manufacturing procedures application to such items, of course, would be carried out, such as deburring, etc., but are not here described for the sake of simplicity.

It can be seen that the resulting structure is both simple to manufacture and efficient in design in the sense that maximum regidity of the saddle clamp member 14 is achieved and the forces necessary for proper crimping of the joined pipe are reduced due to the presence of the integral pressure ridge which is provided without the need for separate machining operations, such as chamfering, etc. and which do not inherently involve sharp edges widely to cause penetration of the clamped pipe, as has been the case in prior art designs.

The three layer construction in which the saddle member is formed with a sheet metal blank provides a very rigid saddle to resist the clamping forces. The alignment of the saddle eyes in alignment with the pressure ridge assures that distorting forces created by an offset of the forces is unavoided to further reduce the specifications required of the clamping assembly elements.

An alternate lighter-duty construction may be provided in which one of the outer layers is terminated after sufficient overlay for a secure welding, and without extending entirely across the central layer with the other outer layer being formed as described above. This saves some material while still afforded the advantage of the integral pressure ridge provided by the protrusion of the central layer. Alignment of the eyes with the central layer is also still maintained.

The embodiments of the invention in which an exclusive property of privilege is claimed are defined as follows:

1. A saddle clamp assembly comrising:
    a saddle member including three sheet layers stacked together with a pair of saddle eyes formed at either end of said stacked layers, each of said layers being contoured along one edge thereof in an arcuate radiused cutout with the central layer cutout being formed with a radius slightly smaller than the outer two layer cutouts, each of the cutouts being concentrically aligned whereby a protruding ridge comprised of the central layer cutout is provided;
    a U-bolt received into said saddle eyes formed and nuts threadably engaging the threaded ends of said U-bolt;
    whereby, pipe sections within the opening defined by the saddle member cutouts and said U-bolt can be compressed by said central layer and said saddle member and by said U-bolt member by tightening of said nuts with said U-bolt member ends, and said central layer provides a pressure ridge for crimping of said clamped pipe sections.

2. The saddle clamp according to claim 1 wherein said three layers are formed of a single sheet of metal folded into said three layer construction, said layer secured together to form a unitary saddle structure.

3. The saddle clamp according to claim 2 wherein said clamp eyes are each formed from a section of said single sheet metal, whereby said eyes are integral with said layers.

4. The saddle clamp according to claim 3 wherein said saddle eyes are located with their centers in alignment with said central layer, whereby the clamping pressure exerted by said nuts bearing on said saddle member eyes are transmitted into said central layer along a line of action in alignment with said central ridge to preclude the imposition of asymmetrical forces imposed on said saddle member by tightening of said nut elements during installation of said clamping assembly.

5. The saddle clamp according to claim 4 wherein said saddle construction includes said single sheet of metal having a first section defining one of said outer layers; an intermediate section formed into one of said saddle eyes; a section integral with said one of said eyes forming said second layer; a second intermediate section formed into the outer of said saddle eyes and a section integral with said other of said saddle eyes extending into and between said first and second outer layers forming said central layer.

6. The saddle clamp according to claim 5 wherein each of said layers are formed with an outer radiused contour which is disposed within the envelope defined by the U-bolt ends received within said saddle eyes.

* * * * *